United States Patent
Egawa et al.

(10) Patent No.: US 7,758,108 B2
(45) Date of Patent: Jul. 20, 2010

(54) VEHICLE REAR PORTION STRUCTURE

(75) Inventors: Yasuhisa Egawa, Sakura (JP); Shigeto Yasuhara, Shioya-gun (JP); Yuji Matsuura, Shioya-gun (JP); Tomohiko Okano, Chikusei (JP)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 12/113,560

(22) Filed: May 1, 2008

(65) Prior Publication Data
US 2008/0277970 A1 Nov. 13, 2008

(30) Foreign Application Priority Data
May 10, 2007 (JP) ............... 2007-126101

(51) Int. Cl.
*B62D 25/08* (2006.01)

(52) U.S. Cl. ............... 296/203.04; 296/204

(58) Field of Classification Search ............ 296/203.01, 296/203.04, 204
See application file for complete search history.

(56) References Cited

U.S. PATENT DOCUMENTS

| 5,350,214 | A | | 9/1994 | Yamauchi et al. |
| 5,580,121 | A | * | 12/1996 | Dange et al. ............. 296/181.4 |
| 6,088,918 | A | | 7/2000 | Corporon et al. |
| 2002/0043814 | A1 | * | 4/2002 | Weiman ..................... 296/29 |

FOREIGN PATENT DOCUMENTS

JP 2006-168434 6/2006

* cited by examiner

*Primary Examiner*—Dennis H Pedder
(74) *Attorney, Agent, or Firm*—Rankin, Hill & Clark LLP

(57) ABSTRACT

A vehicle rear portion structure including: a pair of rear frames that extend substantially in a vehicle longitudinal direction; a rear cross member that extends in a vehicle width direction and that connects both of the two rear frames; a pair of rear wheel houses that are provided with damper supporting portions; a parcel frame that extends along the vehicle width direction above the rear wheel houses; and a pair of reinforcing frames that connect both end portions of the rear cross member and both end portions of the parcel frame, wherein the reinforcing frames are placed along a side wall of respective the rear wheel houses, the side wall being adjacent to respective the damper supporting portions, and a toroidal skeleton frame is formed with the parcel frame, the reinforcing frames, and the rear cross member so as to follow a plurality of rear suspension mounting points.

5 Claims, 5 Drawing Sheets

VEHICLE REAR PORTION STRUCTURE

BACKGROUND OF THE INVENTION

Priority is claimed on Japanese Patent Application No. 2007-126101, filed May 10, 2007, the content of which is incorporated herein by reference.

1. Field of the Invention

The present invention relates to vehicle rear portion structure that is provided with a rear parcel shelf that divides in a vertical direction a vehicle passenger compartment from a trunk space at the rear of a rear seat.

2. Description of Related Art

In a sedan vehicle that is provided with a trunk space, a rear parcel shelf that divides the passenger compartment from the trunk space is located at the rear of the rear seat. A rear parcel shelf is provided with a parcel frame that extends in the vehicle width direction on a front edge side of the rear parcel shelf, and both end frames of this parcel frame are supported above rear wheel houses on the left and right of the vehicle.

A vehicle rear portion structure for a sedan vehicle of this type has been proposed in which the parcel frame is placed on the front side of an apex portion of the left and right rear wheel houses, and both end portions of the parcel frame are connected to a cross member under the floor via reinforcing components (see, for example, Japanese Unexamined Patent Application, First Publication No. 2006-168434).

In this vehicle rear portion structure, the parcel frame and cross members together with the reinforcing components constitute a toroidal skeleton frame. Moreover, the parcel frame and the respective rear wheel houses are connected together by means of separate reinforcing components.

However, in this conventional vehicle rear portion structure, the toroidal skeleton frame that is formed with the parcel frame, the cross members, and the reinforcing components are located on the front side of the apex portion of the rear wheel houses. Because of this, it is impossible to directly support the load input from the rear suspension by means of the toroidal skeleton frame. In order to increase the support rigidity of the rear suspension, it has been necessary to add further reinforcing components.

In view of the above-described circumstances, the present invention has an object of providing a vehicle rear portion structure that achieves both an improvement in body rigidity and a reduction in weight by increasing the support rigidity of a rear suspension without overly increasing the weight thereof.

SUMMARY OF THE INVENTION

In order to achieve the above-described object, the present invention employs the followings. Namely, in an aspect of the present invention, a vehicle rear portion structure includes: a pair of rear frames that extend substantially in a vehicle longitudinal direction; a rear cross member that extends in a vehicle width direction and that connects both of the two rear frames; a pair of rear wheel houses that cover top half portions of both left and right rear wheels, and that are provided with damper supporting portions placed in the vicinity of the apex portions of the rear wheel houses for supporting dampers of rear suspensions; a parcel frame that forms a skeleton of a rear parcel shelf, and extends along the vehicle width direction above the rear wheel houses; and a pair of reinforcing frames that connect both end portions of the rear cross member and both end portions of the parcel frame, wherein the reinforcing frames are placed along a side wall of respective the rear wheel houses, the side wall being adjacent to respective the damper supporting portions, and a toroidal skeleton frame is formed with the parcel frame, the reinforcing frames, and the rear cross member so as to follow a plurality of rear suspension mounting points that include the damper supporting portions.

According to the above described vehicle rear portion structure, a horizontal cross section of the vehicle rear portion is reinforced by the toroidal skeleton frame that is formed with the parcel frame, the respective reinforcing frames, and the rear cross member. Furthermore, the load that is input from the rear suspension is directly supported by the toroidal skeleton frame that has high rigidity in response to torsion in the vehicle body. Namely, the load that is input on a plurality of mounting points for the rear suspension can be directly supported within a plane that is orthogonal to the vehicle longitudinal direction by means of the toroidal skeleton frame. Because of this, it is possible to efficiently improve the support rigidity of the rear suspension without causing any large increase in weight.

It may be arranged such that the vehicle rear portion structure further includes reinforcing components that have a closed section structure, and that cover a top portion of respective the damper supporting portions; top end portions of the reinforcing frames are connected to the parcel frame so as to form substantially T shapes with respective edges thereof; and the reinforcing components are connected to respective the edges of the parcel frame and respective top edge portions of the reinforcing frames.

In this case, joint portions between both the edges of the parcel frame and the respective reinforcing frames are reinforced by the reinforcing components on the upper side of the rear wheel houses. Namely, on the upper side of the rear wheel houses, the joint portions between the parcel frame and the respective reinforcing frames can be reinforced by the reinforcing component having a closed section structure. As a result, it is possible to improve the rigidity of the joint portions between the parcel frame and the respective reinforcing frames while suppressing any buckling into the passenger compartment.

It may be arranged such that the rear frames and both ends of the rear cross member are provided with concave portions that have substantially a U-shaped cross section with an upper side thereof being open, in at least the vicinity of respective joint portions between the respective rear frame members and the rear cross member; bottom ends of the respective reinforcing frames are inserted in and connected to the concave portions of the respective rear frames; and the vehicle rear portion structure further includes an internal reinforcing component of which a vertical cross section parallel to the rear frames is substantially the same shape as a horizontal cross section of each of the reinforcing frames, and which connects the bottom ends of the respective reinforcing frames, the concave portions of the respective rear frames, and the respective concave portions in the rear cross member.

In this case, the bottom portions of the respective reinforcing frames, the respective rear frames, and the rear cross member are connected rigidly in a structure having a continuous cross section by means of the internal reinforcing components. Namely, as a result of the bottom end of each reinforcing frame being joined to the interiors of the respective concave portions of the rear frames, and as a result of the bottom end of each reinforcing frame, the concave portion in each rear frame, and the respective concave portions in the adjacent rear cross member being joined by means of the internal reinforcing components whose vertical cross sections which are parallel with the respective rear frames have substantially the same shape as the horizontal cross sections of the reinforcing frames, the bottom portions of the respective reinforcing frames, the respective rear frames, and the rear cross member form a structure which has a continuous cross section. As a result, it is possible to rigidly connect the three elements of the reinforcing frames, the rear frames, and the rear cross member while suppressing any buckling into the passenger compartment.

It may be arranged such that the rear frames and both ends of the rear cross member are provided with concave portions that have substantially a U-shaped cross section with an upper side thereof being open, in at least the vicinity of respective joint portions between the respective rear frame members and the rear cross member; bottom ends of the respective reinforcing frames are inserted in and connected to the concave portions of the respective rear frames; the vehicle rear portion structure further includes: first internal reinforcing components that are connected to respective the bottom end of the reinforcing frames, and are each placed between the reinforcing frame and the rear cross member inside the concave portion of the rear frame; and second internal reinforcing components that are each placed inside respective the concave portions of the rear cross members; the first internal reinforcing components and the second internal reinforcing components have a vertical cross section parallel with the rear frame, the vertical section having substantially the same shape as the horizontal cross section of the reinforcing frames; and the first internal reinforcing components and the second internal reinforcing components are connected via the respective rear frames.

In this case, the bottom portions of the respective reinforcing frames, the rear frames, and the rear cross member are connected by means of a structure which has a continuous cross section that is formed with the first internal reinforcing component, the second internal reinforcing component, and the respective reinforcing frames. As a result, it is possible to rigidly connect the three elements of the reinforcing frames, the rear frames, and the rear cross member while suppressing any buckling into the passenger compartment.

It may be arranged such that the first internal reinforcing components have a U shape that is open on the rear cross member side thereof.

It may be arranged such that the second internal reinforcing components have a U shape that is open on the bottom side thereof.

In these cases, it is possible to achieve a reduction in the weight of the respective internal reinforcing components and an improvement in ease of mounting, while rigidly connecting the bottom portions of the respective reinforcing frames, the rear frames, and the rear cross member by means of a structure which has a continuous cross section that is formed with the first internal reinforcing component, the second internal reinforcing component, and the respective reinforcing frames.

BRIEF DESCRIPTION OF THE DRAWINGS

FIG. 7A is a schematic view showing an image of load transmission of a rear frame of a comparative example, while

DETAILED DESCRIPTION OF THE INVENTION

Figure 1:
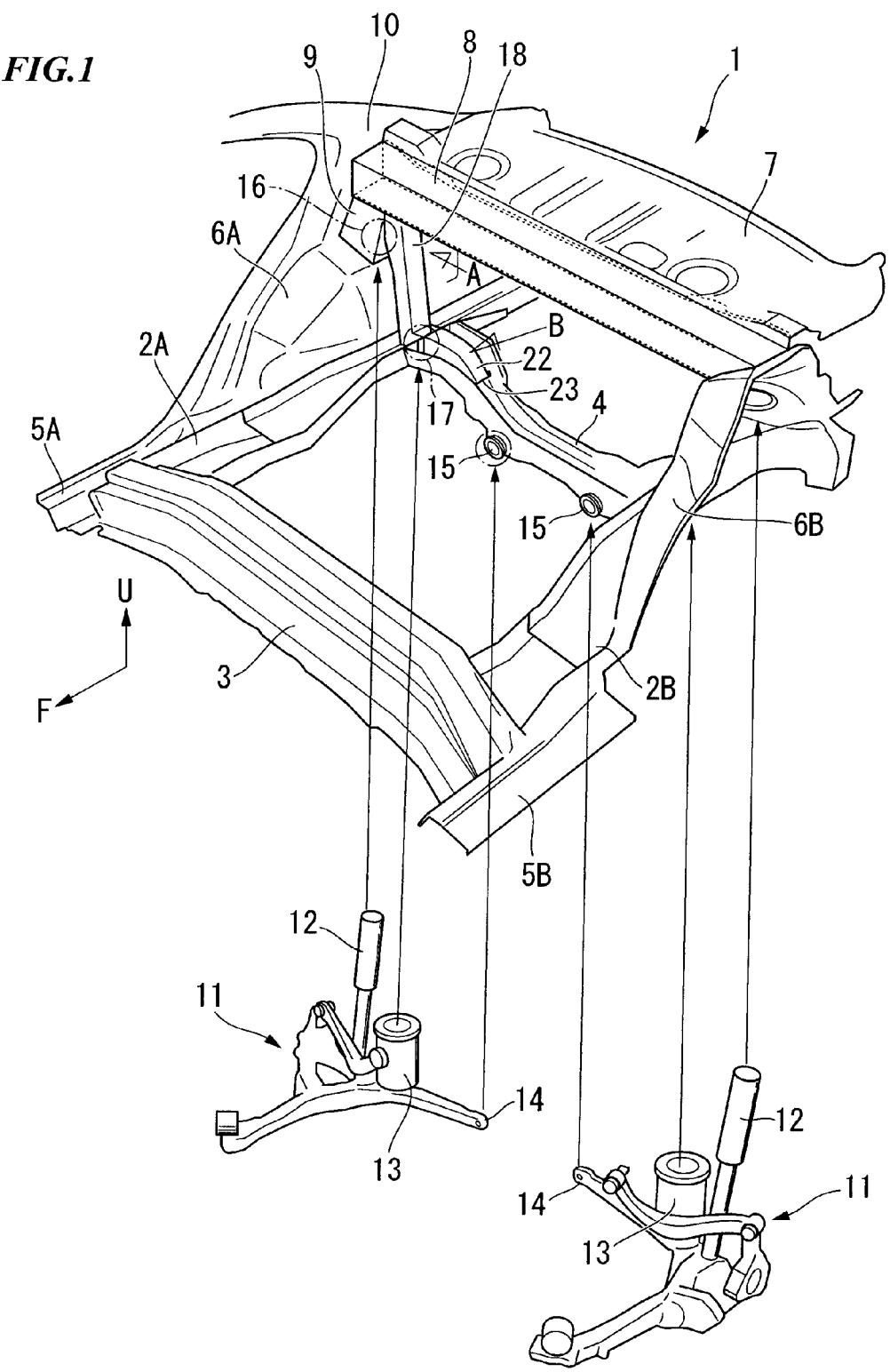
FIG. 1 shows an embodiment of the present invention, and is a perspective view of a vehicle body frame component which has been sliced longitudinally as seen from a diagonally forward and upward direction.

An embodiment of the present invention is described below based on the drawings. Note that in the description given below, unless specifically stated otherwise, 'up', 'down', 'left', and 'right' refer to the up, down, left, and right with respect to a vehicle 1 facing in a forward direction, respectively. In addition, the arrow F in the drawings points towards the front of the vehicle, while the arrow U points towards the top of the vehicle.

Figure 2:
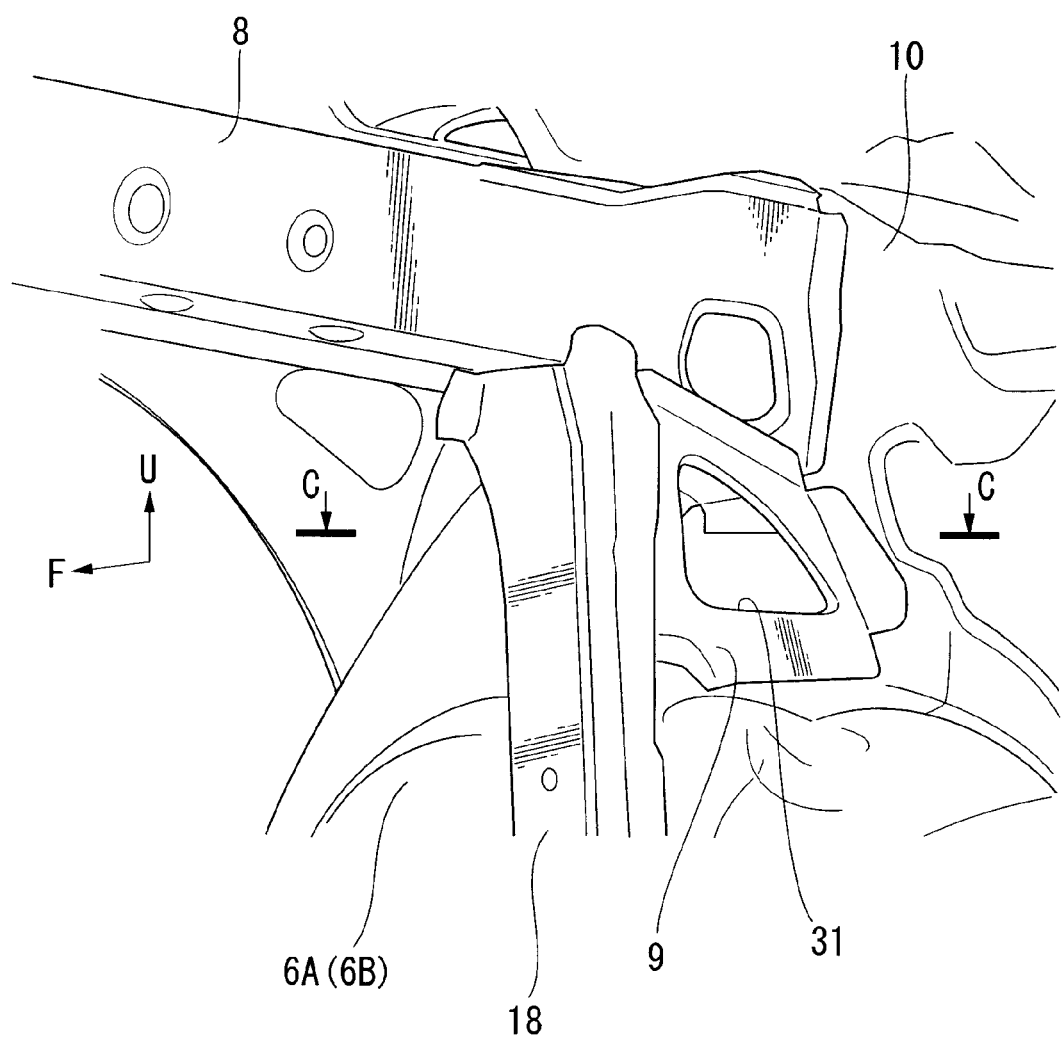
FIG. 2 is a view from a direction of arrow A in FIG. 1.
Figure 3:
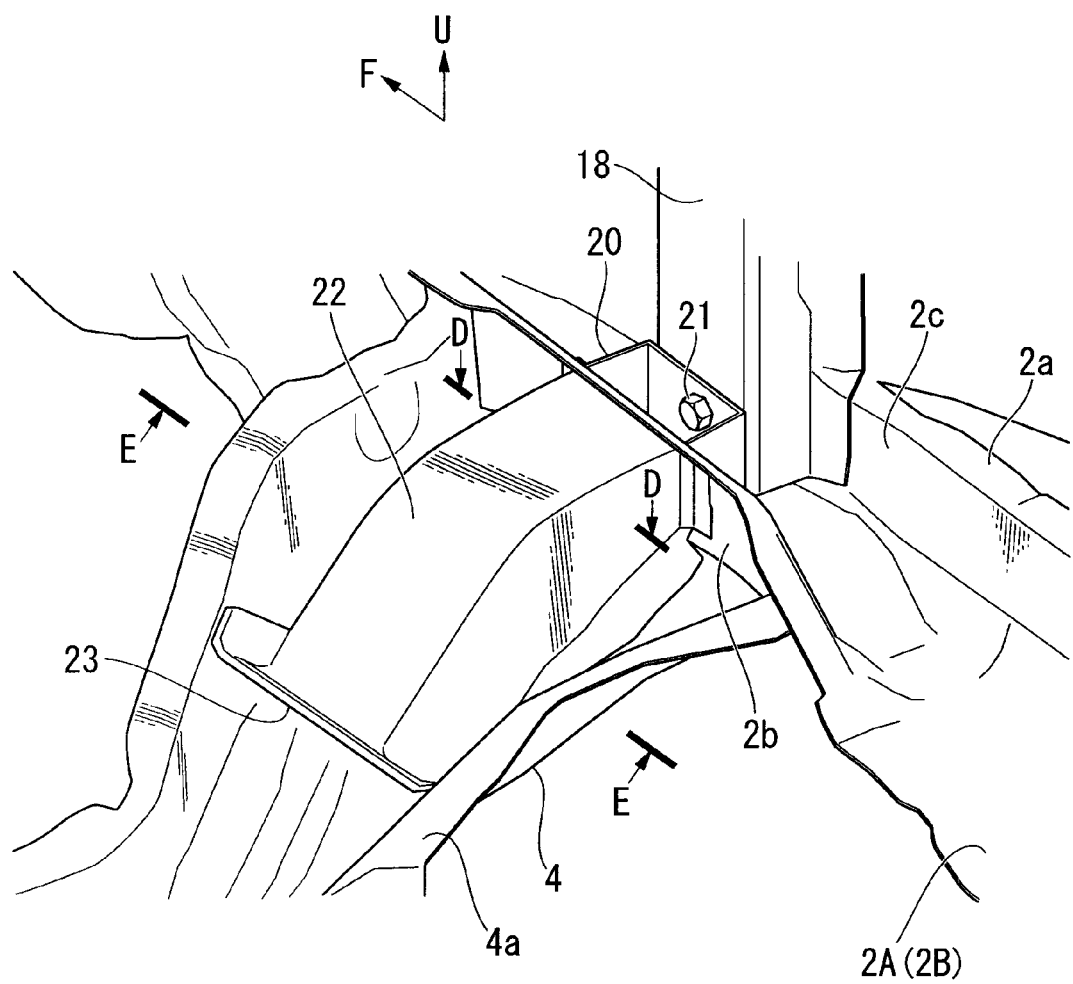
FIG. 3 is a view from a direction of arrow B in FIG. 1.

FIG. 1 shows a sedan vehicle 1 which employs the vehicle rear portion structure according to the embodiment of the present invention, and shows a rear portion of the longitudinally sliced vehicle 1 as seen from a diagonally forward and upward direction. FIGS. 2 and 3 are views respectively from a direction of the arrows A and B in FIG. 1. Note that floor panels such as a spare tire panel have been omitted from these drawings.

As is shown in FIGS. 1 through 3, a pair of rear frames 2A and 2B that extend substantially in the vehicle longitudinal direction are placed on both the left and rear sides of the lower rear portion of the vehicle 1. The two front end portions and substantially intermediate portions of the two rear frames 2A and 2B are mutually connected together by a middle cross member 3 and a rear cross member 4 respectively. Front edge portions of the two rear frames 2A and 2B are each connected to side sills 5A and 5B which are reinforcing components for vehicle side portions. Furthermore, substantially circular arc-shaped rear wheel houses 6A and 6B that cover outer circumferential top half portions of left and right rear wheels (not shown) are provided on both the left and right sides of the vehicle body rear portion. Bottom edges of these rear wheel houses 6A and 6B are each joined to the corresponding rear frame 2A or 2B.

Moreover, a rear parcel shelf 7 that substantially vertically divides the passenger compartment from the trunk space is provided in a position on the rear side of the rear seat (not shown). On a front end portion side of this rear parcel shelf 7, there is provided a parcel frame 8 that has a rectangular cross section and extends substantially in the vehicle width direction. The two end portions of this parcel frame 8 are supported respectively by the rear wheel houses 6A and 6B via damper base covers 9 (i.e., reinforcing components), and are connected to side panel inners 10 that form side walls of the inner side of the vehicle body.

Moreover, as is shown in FIG. 1, a double wishbone type of suspension that supports an independent damper 12 and a spring 13 at separate positions is used for a rear suspension 11 of this vehicle 1. Distal end portions of lower arms 14 of the respective left and right rear suspensions 11 are oscillatingly supported on arm supporting portions 15 that are provided on an inner side in the vehicle width direction of the rear cross member 4. Moreover, top end portions of the dampers 12 of the respective rear suspensions 11 are mounted on damper supporting portions 16 on apex portions of the rear wheel houses 6A and 6B. Furthermore, top end portions of the springs 13 of the respective rear suspensions 11 are mounted on spring supporting portions 17 on bottom surfaces of the rear frames 2A and 2B. The spring supporting portions 17 are each provided in the vicinity of the respective joint portions of the rear cross member 4.

Wheel house frames 18 (i.e., reinforcing components) that have a substantially a U-shaped cross section and extend in a vertical direction are each joined to side surfaces of the left and right rear wheel houses 6A and 6B at positions right beside the respective damper supporting portions 16. Top and bottom ends of the respective wheel house frames 18 are joined to respective end portions of the parcel frame 8 and the rear cross member 4. As is described above, end portions on both sides of the parcel frame 8 and the rear cross member 4 are connected to each other with the wheel house frames 18 and 18 resulting in the parcel frame 8 and the rear cross member 4 forming a toroidal skeleton frame together with the wheel house frames 18 and 18. Moreover, the parcel frame 8 is placed at a position directly above the rear cross member 4 so that, as a result, the entire toroidal skeleton frame is located within a plane which is orthogonal to the longitudinal direction of the vehicle.

As is shown in FIG. 2, top end portions of each wheel house frame 18 are made to abut against a bottom surface of the parcel frame 8 so as to form substantially T-shaped structures together with the respective edges thereof, and are joined to the parcel frame 8. The aforementioned damper base covers 9 (i.e., reinforcing components) that cover the top of the damper supporting portions 16 (see FIG. 1) which are on the apex portions of the rear wheel houses 6A and 6B are placed respectively in space portions that are formed between the rear wheel houses 6A and 6B and the respective edges of the parcel frame 8 that protrude onto the outer side in the vehicle width direction beyond the wheel house frames 18.

Figure 4:
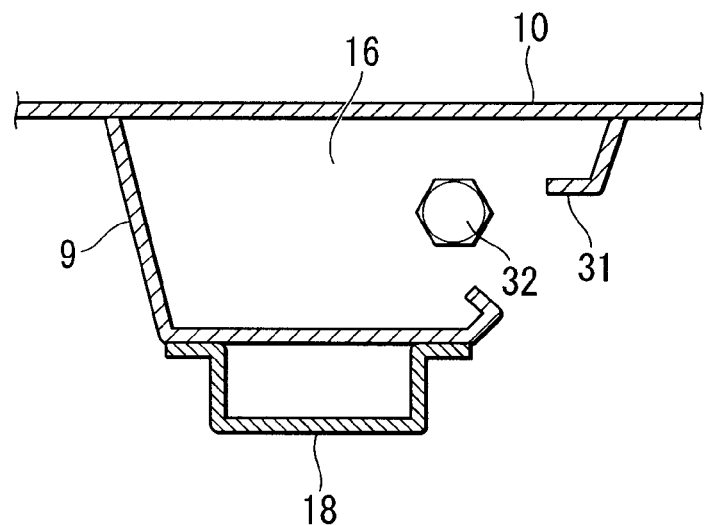
FIG. 4 is a cross-sectional view taken along the line C-C in FIG. 2.

Each damper base cover 9 is formed having substantially a U-shaped cross section as is shown in the cross-sectional view of FIG. 4, and the open sides of the U shape are connected to the side panel inner 10 so as to cover an area surrounding the top of the damper supporting portion 16. Accordingly, the damper base cover 9 together with the side panel inner 10 forms a rectangular, closed section structure. Furthermore, bottom end portions of the damper base covers 9 are connected to an apex portion of the rear wheel house 6A (or 6B) so as to cover the damper supporting portion 16, while, in contrast, top end portions of the damper base covers 9 are connected to an edge of the parcel frame 8. A side surface on the inner side in the vehicle width direction of the damper base cover 9 is connected to a top edge portion of the wheel house frame 18 that protrudes upwards from the rear wheel house 6A (or 6B). Accordingly, the damper base cover 9 which has a closed section structure reinforces the area surrounding the damper supporting portion 16, and also reinforces the joint portion between the parcel frame 8 and the wheel house frame 18.

Note that as is shown in FIG. 4, in order to allow an adjustment nut 32 of the damper 12 to be operated, a working hole 31 is formed in a side wall of the damper base cover 9.

As is shown in FIG. 3, concave portions having substantially a U-shaped cross section that is open in an upward direction are formed in the rear frames 2A and 2B and in the rear cross member 4, and a floor panel 30 (see FIG. 6) is joined to flanges 2a and 4a that are provided on edges of these openings. Furthermore, end portions of the rear cross member 4 are joined in a state of abutting against vehicle inner side walls 2b of the rear frames 2A and 2B.

Figure 5:
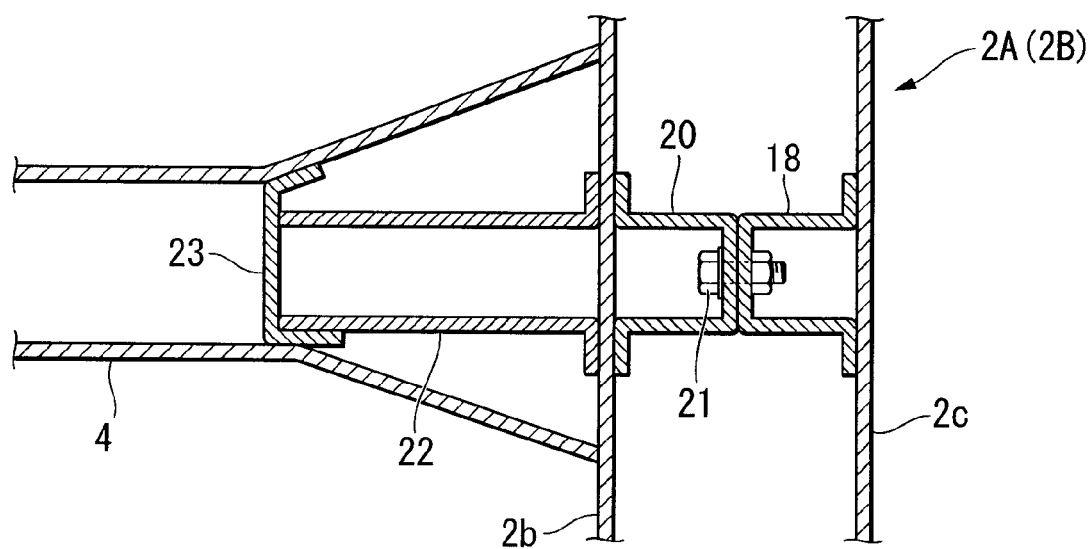
FIG. 5 is a horizontal cross-section viewed in the direction of the arrows D-D in FIG. 3.

A bottom end of the wheel house frame 18 is inserted into a part of the concave portion of the rear frame 2A (or 2B), where the cross member 4 is connected, and this bottom end of the wheel house frame 18 is joined to the vehicle outer side wall 2c. Note that the width of the concave portion of the rear frame 2A (or 2B) at this part is formed larger than the width of the bottom end of the wheel house frame 18 in the vehicle width direction. Because of this, there is a gap between the bottom end of the wheel house frame 18 and the vehicle inner side wall 2b of the rear frame 2A (or 2B), and, as is shown in the cross-sectional view shown in FIG. 5, a first bulkhead 20 (i.e., an internal reinforcing component) which has substantially a U-shaped cross section is housed in this gap. This first bulkhead 20 is joined to the vehicle inner side wall 2b. In the case of the present embodiment, the first bulkhead 20 is further joined to the bottom end of the wheel house frame 18 with a bolt 21, so as to be integral with the wheel house frame 18.

Figure 6:
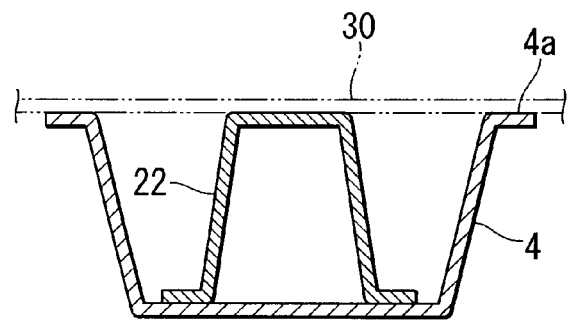
FIG. 6 is a vertical cross-section viewed in the direction of the arrows E-E in FIG. 3.

Moreover, as is shown in cross-sectional view in FIG. 6, a second bulkhead 22 (i.e., an internal reinforcing component) which has substantially a U-shaped cross section that is open at the bottom and extends from the vehicle inner side wall 2b of the rear frame 2A (or 2B) towards the inner side in the vehicle width direction is joined to a bottom portion of the concave portion in the rear cross member 4. One end portion of this second bulkhead 22 is closed off by a planar third bulkhead 23 (i.e., an internal reinforcing component), and circumferential edge portions of this third bulkhead 23 are joined to an internal surface of the concave portion in the rear cross member 4.

The aforementioned first, second, and third bulkheads 20, 22, and 23 are connected to the rear frame 2A (or 2B) and the rear cross member 4, and form a cross section that is continuous from the wheel house frame 18 to the rear cross member 4.

Namely, the horizontal cross section of the wheel house frame 18, and vertical cross sections of the first, second, and third bulkheads 20, 22, and 23 that is parallel with the rear frame have substantially the same shape, forming a continuous structure.

As has been described above, in this vehicle rear portion structure of the vehicle 1, the toroidal skeleton frame that is created by mutually connecting together the two end portions of the parcel frame 8 and the rear cross member 4 with the wheel house frames 18 and 18 is placed between the side portions of the rear wheel houses 6A and 6B. The arm supporting portions 15, the damper supporting portions 16, and the spring supporting portions 17, which are mounting points for the rear suspension 11, are provided along this toroidal skeleton frame. Because of this, it is possible to increase the torsional rigidity of the vehicle body by means of this toroidal skeleton frame, and load input from the rear suspension 11 is directly received by the toroidal skeleton frame. As a result, it is possible for the properties of the rear suspension 11 to be demonstrated to their maximum potential. Namely, the loads that are input from the arm supporting portion 15, the damper supporting portion 16, and the spring supporting portion 17 can be rigidly supported within the same plane by the toroidal skeleton frame. Because of this, it is possible to eliminate any variation in the timing of the load inputs at each of the supporting points 15, 16, and 17 (i.e., the mounting points) when the vehicle is making a turn or the like, and, as a result, to increase the responsiveness of the suspension.

Accordingly, in the case where this vehicle rear portion structure is being employed, it is possible to efficiently improve the support rigidity of the rear suspension 11 without adding any heavy reinforcing components. As a result, it is possible to achieve both an improvement in rigidity and a reduction in weight.

Moreover, in this vehicle rear portion structure, substantially a center position of the left and right rear frames 2A and 2B is supported by the toroidal skeleton frame which arises from the rear frames 2A and 2B. Because of this, a considerable load can be received by the rear frames 2A and 2B at the time of a rear vehicular collision.

Figure 7A:
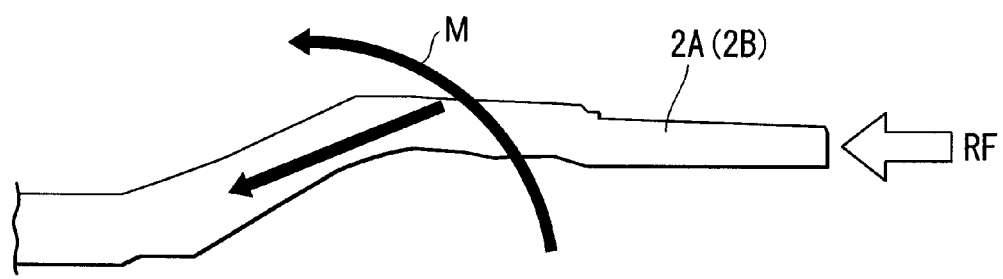
Figure 7B:
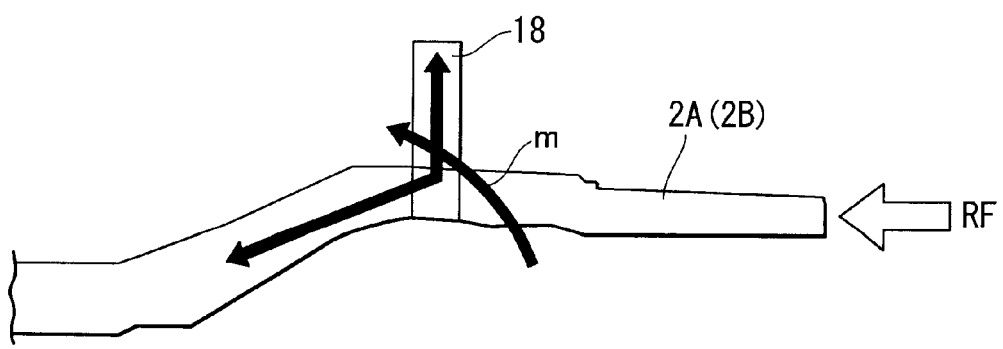
FIG. 7B is a schematic view showing an image of load transmission of a rear frame of the embodiment.

Namely, if there is no toroidal skeleton frame, as is shown in FIG. 7A, a load RF that is input into a rear portion of the rear frames 2A and 2B acts unchanged as a large bending moment M on the rear frames 2A and 2B. In contrast, in the vehicle rear body structure of the present embodiment which has a toroidal skeletal frame, as is shown in FIG. 7B, since a portion of the load RF is dispersed in each wheel house frame 18 at substantially a central position between the rear frames 2A and 2B, it is possible to further reduce the bending moment m acting on the rear frames 2A and 2B.

Moreover, in this vehicle rear portion structure, top end portions of wheel house frames 18 are abutted against and joined to the parcel frame 8 so as to form what is substantially a T shape with the respective edges of the parcel frame 8. Moreover, the damper base cover 9 is provided in each of the spaces that are formed between the rear wheel houses 6A and 6B and the respective edges of the parcel frame 8 which protrudes towards the outer side of the vehicle from each wheel house frame 18. Each damper base cover 9 is connected to the respective edges of the parcel frame 8 and each of the top edge portions of the wheel house frames 18. Because of this, it is possible to rigidly connect the parcel frame 8 to the wheel house frame 18 while suppressing any buckling into the passenger compartment.

Furthermore, in this vehicle rear portion structure, the bottom end of each wheel house frame 18 is joined to the inside of concave portions of the rear frames 2A and 2B that have substantially a U-shaped cross section. The first bulkheads 20 that have a U-shaped cross section are each joined between the bottom end of each wheel house frame 18 inside the concave portion and the vehicle inner side wall 2b of the respective rear frames 2A and 2B, while the second bulkhead 22 and the third bulkhead 23 are joined inside the concave portion, which has substantially a U-shaped cross section, of each end of the rear cross member 4 so as to be continuous with the cross section of the first bulkhead 20 sandwiching each vehicle inner side wall 2b. As a result, in the interior portions of the rear frames 2A and 2B and the rear cross member 4, it is possible to rigidly connect together the three components of the wheel house frame 18, the rear frames 2A and 2B, and the rear cross member 4 so as to form a continuous cross section. Accordingly, in these portions as well, it is possible to increase the rigidity of the joint portions while suppressing any buckling into the passenger compartment.

In the vehicle rear portion structure of this embodiment, because it is possible to sufficiently suppress the amount of buckling into the passenger compartment of the toroidal skeleton frame, as is described above, when an open portion is secured below the parcel frame 8 so as to form what is known as a trunk through structure, the advantage is obtained that it is possible to secure a sufficiently large width for this open space.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle rear portion structure comprising:
   a pair of rear frames that extend substantially in a vehicle longitudinal direction;
   a rear cross member that extends in a vehicle width direction and that connects both of the two rear frames while both ends of the rear cross member are flared in a width direction of the rear cross member;
   a pair of rear wheel houses that cover top half portions of both left and right rear wheels, and that are provided with damper supporting portions placed in the vicinity of the apex portions of the rear wheel houses for supporting dampers of rear suspensions;
   a parcel frame that forms a skeleton of a rear parcel shelf, and extends along the vehicle width direction above the rear wheel houses;
   a pair of wheel house frames that connect both end portions of the rear cross member and both end portions of the parcel frame, wherein
   the wheel house frames are placed along a side wall of respective said rear wheel houses, the side wall being adjacent to respective said damper supporting portions,
   a toroidal skeleton frame is formed with the parcel frame, the wheel house frames, and the rear cross member so as to have a plurality of rear suspension mounting points that include the damper supporting portions,
   concave portions having substantially a U-shaped cross section with an upper side thereof being open are formed in the rear frames and in the rear cross member, and a floor panel is joined to a pair of flanges that are provided on edges of the upper side of each concave portion,
   end portions of the rear cross member are joined in a state of abutting against vehicle inner side walls of the rear frames,
   bottom ends of the wheel house frames are inserted into a part of the concave portions of the rear frames, where the cross member is connected, and said bottom ends of the wheel house frames are joined to vehicle outer side walls, forming gaps between said bottom ends and the vehicle inner side walls,
   a pair of first bulkheads housed in said gaps, being joined to the vehicle inner side walls and being joined to the bottom ends of the wheel house frames, so as to be integral with the wheel house frames,
   a pair of second bulkheads extend from the vehicle inner side walls of the rear frames towards inner sides in the vehicle width direction being joined to bottom portions of the concave portion in the rear cross member.

2. The vehicle rear portion structure according to claim 1, wherein
   the vehicle rear portion structure further comprises a plurality of reinforcing components that have a closed section structure, and that cover a top portion of respective said damper supporting portions;
   top end portions of the wheel house frames are connected to the parcel frame so as to abut against a bottom surface of the parcel frame; and
   the plurality of reinforcing components are connected to respective said edges of the parcel frame and respective top edge portions of the wheel house frames.

3. The vehicle rear portion structure according to claim 1, wherein said bulkheads have a U shape that is open on the rear cross member side thereof.

4. The vehicle rear portion structure according to claim 1, wherein said bulkheads have a U shape that is open on the bottom side thereof.

5. The vehicle rear portion structure according to claim 1, wherein said second bulkheads are closed off by planar third bulkheads, and circumferential edge portions of the third bulkheads are joined to an internal surface of the concave portion in the rear cross member.

* * * * *